W. O. DUNTLEY.
ELECTRIC DRILL.
APPLICATION FILED JAN. 20, 1905.

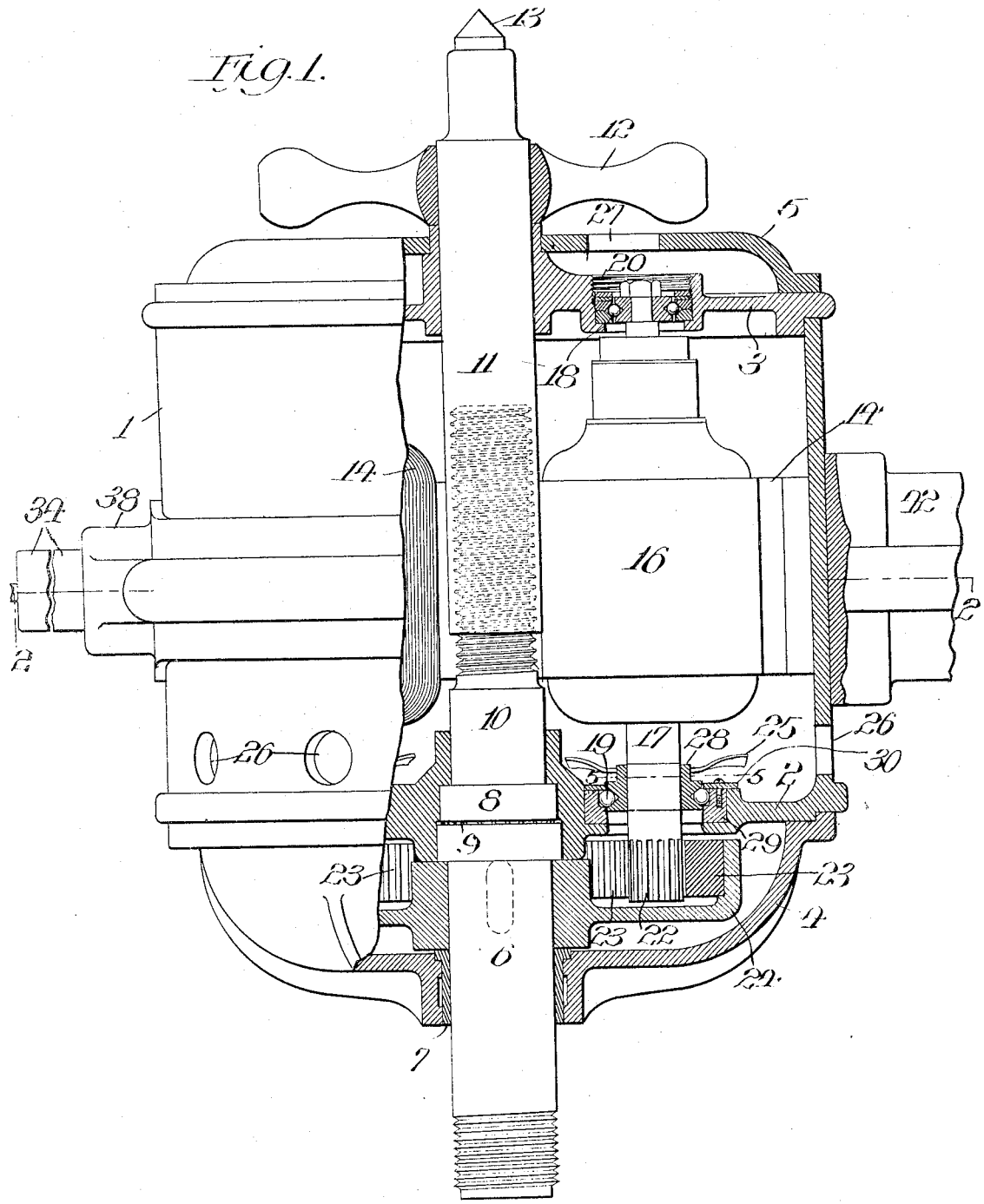

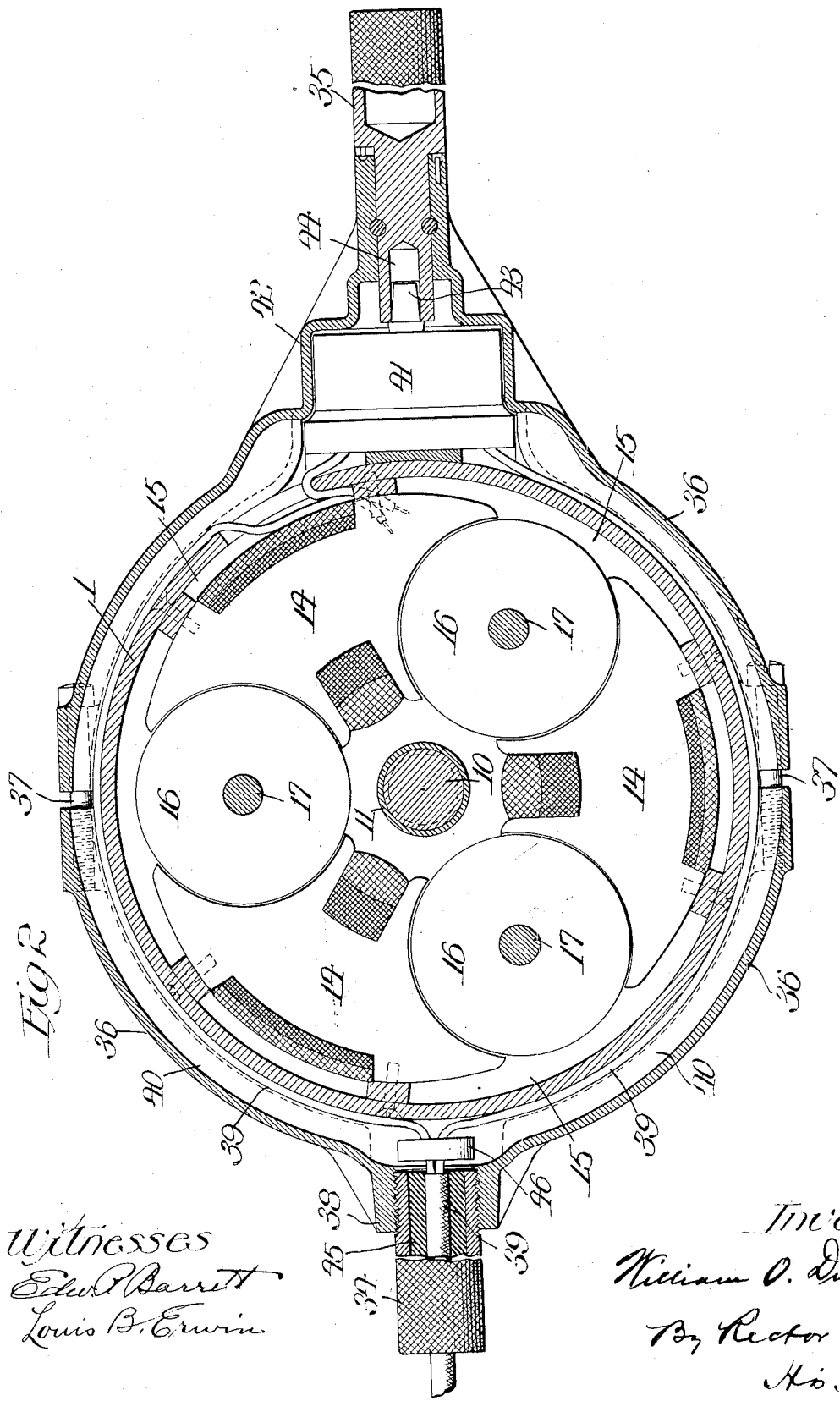

993,352.

Patented May 30, 1911.
4 SHEETS—SHEET 3.

Witnesses

Inventor
William O. Duntley
By Rector Hibben
His Attys

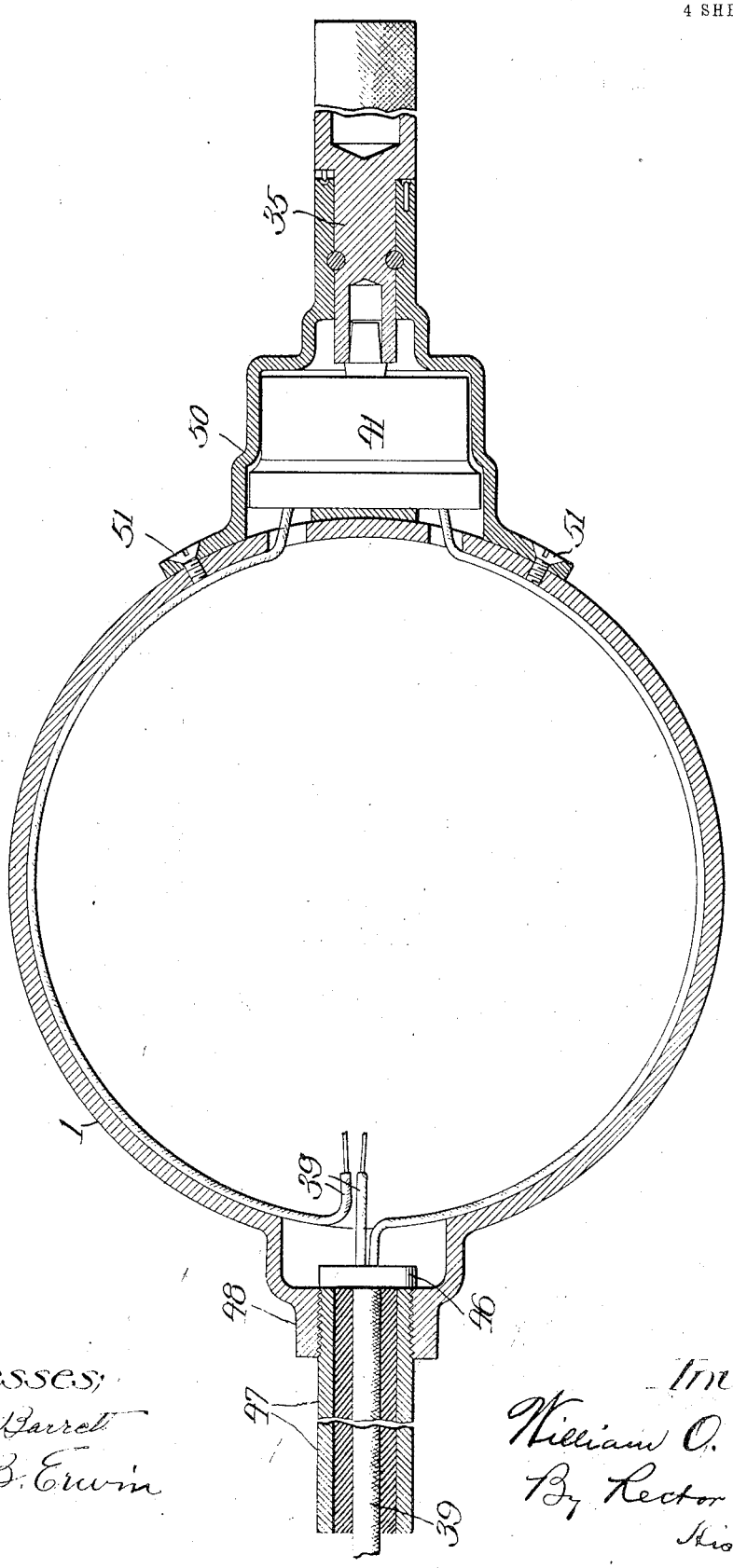

UNITED STATES PATENT OFFICE.

WILLIAM O. DUNTLEY, OF CHICAGO, ILLINOIS, ASSIGNOR TO CHICAGO PNEUMATIC TOOL COMPANY, OF CHICAGO, ILLINOIS, A CORPORATION OF NEW JERSEY.

ELECTRIC DRILL.

993,352.

Specification of Letters Patent. Patented May 30, 1911.

Application filed January 20, 1905. Serial No. 241,937.

*To all whom it may concern:*

Be it known that I, WILLIAM O. DUNTLEY, a citizen of the United States, residing at Chicago, Cook county, Illinois, have invented certain new and useful Improvements in Electric Drills, of which the following is a specification.

My invention relates to a tool, more particularly a drill, operated by electricity and the object thereof is to produce a machine of this character preferably portable, which shall be most efficient, durable and powerful in proportion to its weight, and, to this end, I provide a plurality of motors disposed within a cylindrical shell or casing and annularly around the axial line of the tool spindle or shaft, and gear the armatures to such spindle through a medium common to all the motors, besides which I provide the machine or drill with means for ventilating and thereby cooling the parts within the casing, with the result that the machine is capable of constant and continued operation without heating. In the present instance, and for the sake of clear and definite description, my invention is shown embodied in a machine for the specific work of drilling and the same is hereinafter termed a drill.

Figure 3:
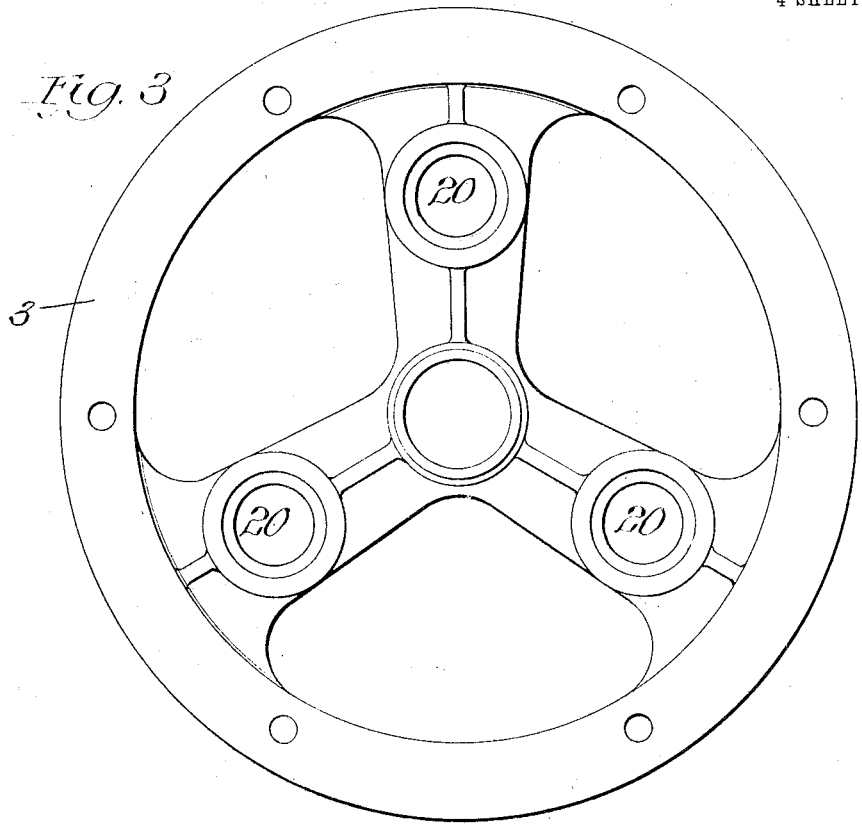
Figure 2:
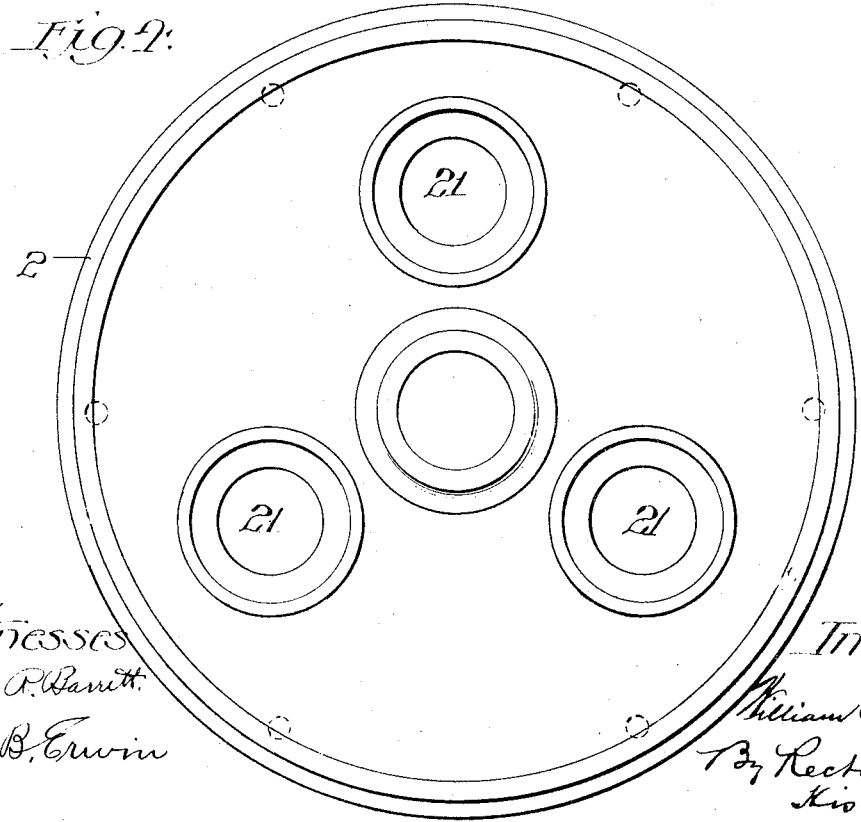

In the drawings, Figure 1 is an elevation of my drill with a portion of the shell or casing broken away to expose the parts within; Fig. 2 a section on line 2—2 of Fig. 1; Figs. 3 and 4 detail views of the end heads; Fig. 5 a section on the line 5—5 of Fig. 1; and Fig. 6 a section of the casing and handles, illustrating a modified form of construction.

Referring to the construction herein shown, the body of the drill comprises a cylindrical shell or casing 1, of suitable dimensions and proportions, which shell is, by preference, of suitable non-magnetic material, such as aluminum, and is adapted to contain and support the plurality of electric motors. These motors are, in the present instance, three in number, for which reason the present machine is designated as a "tri-motor" drill.

The shell or casing of the drill has the two end heads 2 and 3 (illustrated in Figs. 3 and 4) which may be separate or integral with the casing itself. In the present instance, however, the lower or bottom head 2 is made integral with the casing and the upper head 3 separate therefrom but clamped thereto. Bottom and top caps 4 and 5, respectively, are secured to the ends of the casing in any suitable manner, the top cap covering the top end head 3 and its bearings, while the bottom cap constitutes a gear case or housing for the gearing between the electric motors and the tool spindle.

The tool spindle or shaft 6 is arranged axially of the drill and in position to directly receive the thrust or pressure applied thereto. As shown in Fig. 1, this tool spindle has a bearing intermediate its length in a bushing 7 arranged in a central opening in the bottom cap 4 and also has a bearing at its upper end in a counterbore in the center of the end head 2. As hereinafter explained, this tool spindle is operatively connected with the electric motors and driven thereby. In the present instance, the tool spindle has a thrust bearing against the head 8 of a fixed feed screw or shaft 10 of a force feed device, which head is also received in the counterbore of the end head 2 of the casing, ball bearings 9 being arranged between the head of the tool spindle and the head of the feed screw, as seen in Fig. 1.

As herein shown, the fixed feed screw or shaft 10, which is positioned axially of the tool spindle and of the series of motors, is screw-threaded and projects upwardly so as to be engaged by the inwardly projecting and longitudinally movable feed screw sleeve 11. This feed screw sleeve extends through central openings in the end head 3 and top cap 5 and is provided extraneous of the casing with the hand levers or wheel 12, such sleeve terminating in, or being provided with, a centering point 13.

The plurality of electric motors (three in the present instance) are arranged in vertical position and grouped around the feed screw and axial line of the tool spindle, that is, disposed annularly thereof. The windings of the field magnet system, which is of novel and original construction and arrangement, forms no part of my invention but is the invention of another and consequently no detailed description thereof need be given. The field magnets 14, which are three in number, are secured in suitable manner to the inner face of the casing, but preferably in such manner as to leave ventilating space 15 between them and such casing, Figs. 1 and 2 and the same alternate with the armatures in the manner clearly indicated in Fig. 2, the field magnets equaling the armatures in number.

The armatures 16 each have a shaft 17 which is of course in vertical position when the drill is in the position illustrated in Fig. 1, and are provided with the ball bearings 18 and 19 arranged in the openings 20 and 21 respectively in the end heads. As hereinafter made apparent, provision is made for enabling the top end head 3 to be bodily removed with the motors all attached so that the parts may be readily taken apart and reassembled.

The lower end of each armature shaft extends through its lower bearing 19 and through its end head 2 and terminates in or is provided with a pinion 22 adapted to mesh with the circular rack or gear 23 of a gear plate 24 which is keyed or otherwise secured to the tool spindle. The pinions of the three armatures engage or mesh with the rack at points thereon one hundred and twenty degrees apart and act in unison in the driving of the gear plate and, in consequence, in the driving of the tool spindle. By preference, the gear casing 4 is closed and is filled or supplied with oil or grease to provide constant lubrication for the gear and pinion.

As hereinbefore stated, the drill has provision for air cooling and to this end the armatures are equipped, preferably near their lower ends, with fans 25 (Fig. 1) which are adapted to suck the air into the casing through side openings 26 therein and distribute and force such air upwardly around the armatures and field magnets and through the ventilating spaces 15. The air passes through the openwork of the top end head (Fig. 3) around the bearings therein and out through the openings 27 in the top cap 5.

As shown in Figs. 1 and 5, the fans 25 are not mounted direct upon the armature shaft but upon the rotatable ball-bearing collar 28 which is received within the bearing socket or piece 29. The bearing collar is held within the socket by means of a washer 30 projecting inwardly over the bearing collar. The upper end of the opening through the bearing is angular so as to receive the partial collars 31 formed on opposite sides, with the result that while the armature shaft is removable the rotation thereof is transmitted to the fan through the medium of the bearing collars 28 to which such fan is secured or upon which it is mounted. The upper bearing of each armature shaft is such that the shaft is held therein and also to the end head 3 so as to be withdrawable together with such head. As detailed in Fig. 1 a split bearing collar 32 is pressed upon the upper end of each armature shaft and together with the balls of the bearing are arranged to be retained within its opening 20 in the top end head. A nut 33 screwing into the opening 20 is adapted to lock the bearing in place, Fig. 1. The construction and arrangement of the bearings is thus such that the end head 3 may be removed with the three motors hung or suspended from them, inasmuch as the upper bearings are fixed to that head and the lower ends of the armatures are removable from their bearings in the lower head. Furthermore, when the electric motors are thus removed the fans are left in place and undisturbed, with the result that they are not liable to become bent, as would be the case if they were secured to the armature shafts.

It will be understood that the construction of the bearings (upper and lower) as above described may be applied to drills or the like having any number of electric motors, either one, two, three motors, and so on.

My invention also relates to a novel and original construction of the grasping handles and arrangement of the leading in wires, as illustrated in their preferred form in Figs. 1 and 2, and in their modified form in Fig. 6.

Referring to Figs. 1 and 2, the two handles 34 and 35 are respectively the dead and live handles, both of them having extensions 36 forming parts of a split band held together at their adjacent ends by the clamping screws 37 whereby the handles are firmly clamped to the outer surface of the shell or casing of the drill. In the present instance, the dead handle is formed separate from its band section 36 and screws into the tubular extension 38 of the latter (Fig. 2). This handle is hollow or provided with a longitudinal bore within which is preferably inserted a hollow non-conducting plug 45, for the purpose of receiving the cable composed of the two leading in wires 39 communicating with a source of electric power. These wires divide adjacent the inner end or base of the dead handle and extend circumferentially and around the outside of the casing through grooves or channels 40 formed by an expanding, longitudinally, of the middle portion of the clamping band. One of these wires passes through an ordinary snap switch 41 located adjacent the inner end or base of the live handle 35 (Fig. 2). As shown, the inner end of the live handle as a whole is formed as a casing or box 42 conforming to the contour of the switch and fitting thereon for the purpose of holding the latter in place and enabling its switch button 43 to be operated by engagement of the slotted inner end 44 of the live handle proper, which has engagement with the switch box so as to rotate with respect thereto. By preference, this switch box is made integral with the band section belonging to the live handle. The wires are of course connected with the motors in proper manner, requiring no description.

By preference, the wires or cable at a point adjacent the inner end of the handle are provided with a ring or ferrule 46, of circular form before use, and pinched upon the wires, Fig. 1. This ferrule being too large to pass through the handle thus prevents the wires from being drawn therethrough and relieves the switch connections in case the drill should, by chance, be lifted and carried by the electric cable.

By the construction of the handles and running of the wires as hereinbefore stated, several advantageous results are obtained, chief among which may be mentioned the non-interference of the wires with the rotatable or live handle and the freedom of the wires from any wearing action on the dead handle, which would occur if they were connected with the live handle. Referring to the first advantageous result named, it will be observed that the switch may be easily gotten at by simply unclamping the band; whereupon the live handle and its band section and switch box may be withdrawn bodily without the necessity of removing any wires, such wires being thus absolutely independent of such operation. Again, it will be understood that as the dead handle is fixed or stationary as regards the casing, the wires which are passed therethrough are not subject to any wearing or abrading action, and moreover the leading of the wires through the extreme end of one of the handles keeps them from being entangled with the work or with the feet of the operator.

In Fig. 6 I have illustrated a modified form of construction as regard the handles, in which the split band is dispensed with. In the modified form the dead handle 47 screws onto a tubular extension 48 preferably formed integral with the casing, but which may be separate and secured thereto. The live handle 49 is provided, as before, with a switch box or socket portion 50 at its inner end to fit over the switch. As shown in Fig. 6 this switch box is secured to the casing in suitable manner, as by the screws 51. The leading in wires instead of passing around the outside of the casing as in the construction hereinbefore described pass around to the opposite side on the inner side thereof to the switch. In both forms of construction, however, the advantages already recited are obtained.

Although I have shown and described details of construction I do not intend to be understood as limiting myself thereto, as I contemplate changes in form, proportion of parts, and substitution of equivalents as circumstances may require or render expedient, and moreover, I contemplate using my invention wherever applicable.

I claim:

1. A portable electric drill comprising a tool shaft or driven spindle, a plurality of electric motors arranged annularly of the axial line of said shaft and all operatively connected therewith, a casing inclosing said motors and supporting the field magnets thereof, said field magnets alternating with the armatures, and being in common between adjacent armatures, and grasping handles on said casing.

2. A portable electric drill comprising a tool shaft or driven spindle, a plurality of electric motors arranged annularly of the axial line of said shaft and all operatively connected therewith and a casing inclosing the motors and forming the field frame thereof by supporting their field magnets which alternate with the armatures of the motors and grasping handles for the manipulation of the drill.

3. A portable electric drill comprising a casing, a tool shaft or spindle journaled therein, a plurality of electric motors annularly disposed around the axial line of said shaft or spindle, the field magnets alternating with the armatures, pinions on the armature shafts of the motors, a gear wheel connected with the tool spindle with which each of the pinions meshes, said casing inclosing and supporting the field magnets, armatures and gearing.

4. A portable electric drill comprising a casing, a tool shaft or spindle journaled therein, a plurality of electric motors annularly disposed around the axial line of said shaft or spindle, the field magnets alternating with the armatures, pinions on the armature shafts of the motors, an internal gear wheel connected with the tool spindle and with which each of the pinions meshes, said casing inclosing and supporting the motors and gearing.

5. In an electric drill, the combination of a casing, a tool shaft or spindle, electrically operated mechanism for rotating said spindle including electric motors and a bearing plate therefor, and a force feed device extending centrally of said casing and axially of said spindle, said device bearing in said plate and being arranged to transmit its pressure against the head or inner end of the tool spindle.

6. In an electric drill, the combination of a tool shaft or spindle, a plurality of electric motors annularly disposed around the axial line of said spindle and operatively connected with such spindle, and a force feed device arranged axially of the tool spindle and centrally of the motors.

7. In an electric drill, the combination of a casing, a tool shaft or spindle, electrically operated mechanism including a plurality of electric motors for rotating said spindle, a force feed device extending into said casing axially of said spindle and centrally of the motors, and bearings interposed between the inner ends of said device and said spindle.

8. In an electric drill, the combination of a tool shaft or spindle, a plurality of electric motors annularly disposed around the axial line of said spindle, said motors being operatively connected with the tool spindle, and a feed adjusting screw arranged axially of the tool spindle and of the series of motors.

9. In an electric drill, the combination of a tool shaft or spindle, a plurality of electric motors annularly disposed around the axial line of said spindle, said motors being operatively connected with the tool spindle, a fixed screw-threaded shaft arranged axially of the series of motors, and a feed screw engaging the said fixed shaft.

10. In a portable electric drill, the combination of a tool shaft or spindle, a plurality of electric motors annularly disposed around the axial line of said spindle but arranged beyond the inner end thereof, all of said motors being operatively connected with the tool spindle by gearing, and end heads each having a plurality of bearings for the armature shafts of the motors.

11. In an electric drill, the combination of a tool shaft or spindle, a plurality of electric motors annularly disposed around the axial line of said spindle, said motors being operatively connected with the tool spindle, end heads having a plurality of bearings for the motor armatures and a feed screw entering said heads centrally thereof.

12. In an electric drill, the combination of a tool shaft or spindle, a plurality of electric motors annularly disposed around the axial line of said spindle, said motors being operatively connected with the tool spindle, end heads having a plurality of bearings for the motor armatures and provided with central openings, and a feed device comprising a fixed shaft received by the central opening of the lower end head and projecting upwardly therefrom and screw-threaded at its upper end, and a movable feed screw proper engaging said shaft and passing through the central opening of the upper end head.

13. In an electric drill, the combination of a tool shaft or spindle, a plurality of electric motors annularly disposed around the axial line of said spindle, said motors being operatively connected with the tool spindle, end heads having a plurality of bearings for the motor armatures and provided with central openings, and a feed device comprising a fixed shaft received by the central openings of the lower end head and projecting upwardly therefrom and screw-threaded at its upper end, and a movable screw-threaded sleeve forming the feed screw proper and engaging said shaft, said sleeve passing through the central opening of the upper end head.

14. In an electric drill, the combination of a tool shaft or spindle, a plurality of electric motors annularly disposed around the axial line of said spindle and operatively connected with the tool spindle, a fixed screw-threaded shaft arranged axially of the tool spindle, a feed screw engaging said fixed shaft, and bearings interposed between the inner adjacent ends of the fixed shaft and the tool spindle.

15. In an electric drill, the combination of a shell or casing forming a field frame common to a series of electric motors, a series of field magnets arranged within the shell alternately with the armatures and connected with such shell but forming ventilating spaces therebetween, a series of armatures disposed annularly with respect to the axial line of the shell, a series of fans on the armatures to force air through the casing and through said ventilating spaces, and a tool spindle with which said armatures are operatively connected.

16. In an electric drill, the combination of a shell or casing, an electric motor therewithin, a tool spindle with which such motor is operatively connected, an electric switch on one side of the shell or casing, and two handles arranged at opposite sides of the casing, one of the handles being a dead handle with a passage therethrough, and the other being a live and rotatable handle having means for operating said switch, the leading in wires entering said dead handle and running to the switch.

17. In an electric drill, the combination of a shell or casing, an electric motor therewithin, a tool spindle with which such motor is operatively connected, an electric switch on one side of the shell or casing, and two handles arranged at opposite sides of the casing, one of the handles being a dead handle with a passage therethrough and the other being a live handle comprising a stationary socket portion or box fitting over the switch and a portion rotatable in said socket portion said rotatable portion being arranged to operate said switch, the leading in wires passing in through the dead handle and extending to the switch.

18. In an electric drill, the combination of a shell or casing, an electric motor therewithin, a tool spindle with which such motor is operatively connected, an electric switch on one side of the shell or casing, and two handles arranged at opposite sides of the casing, one of the handles being a dead handle with a passage therethrough and the other being a live handle comprising a stationary socket portion or box fitting over the switch and a portion rotatable in said socket portion and operatively connected with the switch, said socket portion being connected with the casing and removable therefrom and from the switch without interference with the wires, and leading in wires passing through the dead handle and across the body of the drill to the switch.

19. In an electric drill, the combination of a shell or casing, an electric motor therewithin, a tool spindle with which such motor is operatively connected, an electric switch on one side of the casing, a live and a dead handle, a split band clamped to the casing and connected with said handles, said dead handle being hollow and receiving the leading in wires which are run to the switch.

20. In an electric drill, the combination of a shell or casing, an electric motor therewithin, a tool spindle with which such motor is operatively connected, an electric switch on one side of the casing, a live and a dead handle, a split band clamped to the casing and connected with said handles, and screws engaging the adjacent ends of the portions of the band for clamping them to the casing.

21. In an electric drill, the combination of a shell or casing, an electric motor therewithin, a tool spindle with which such motor is operatively connected, an electric switch on one side of the casing, a live and a dead handle, a split band clamped to the casing and connected with said handles, said band being outwardly expanded to form grooves for the reception of the wires, said dead handle being hollow and receiving the leading in wires which are run through the grooves in the band and to the switch.

22. In an electric drill, the combination of a shell or casing, an electric motor therewithin, a tool spindle with which such motor is operatively connected, an electric switch on one side of the casing, a live and a dead handle, a split band clamped to the casing and connected with said handles, one portion of said band having a tubular extension to receive the dead handle, and the other portion thereof having a socket to fit over the switch.

23. In an electric drill, the combination of a shell or casing, an electric motor therewithin, a tool spindle with which such motor is operatively connected, an electric switch on one side of the casing, a live and a dead handle, a split band clamped to the casing and connected with said handles, said band being outwardly expanded to provide a groove or channel for the leading in wires, one portion of said band having a tubular extension to receive the dead handle, and the other portion thereof having a socket fitting over the switch and means for clamping the band to the casing, said dead handle being hollow and arranged to permit the passage of the leading in wires through the channel to the switch.

24. In an electric drill, the combination of a casing, end heads therefor, an electric motor arranged in the casing and having its bearings in such heads, and means whereby the armature of the motor may be bodily removable together with one of the end heads.

25. In an electric drill, the combination of a casing, end heads therefor, an electric motor arranged in the casing and having its bearings in such heads, the motor being removable as to one of its bearings and fixed as to its other bearing to enable the armature of the motor to be bodily removed with one of the end heads.

26. In an electric drill, the combination of a casing, end heads therefor, an electric motor arranged in the casing and having its bearings in such heads, one of the bearings having a bearing collar actuated by the armature shaft which is removable therefrom.

27. In an electric drill, the combination of a casing, end heads therefor, an electric motor arranged in the casing and having its bearings in such heads, one of the bearings comprising a socket piece fitting in its end head, balls therein, and a bearing collar actuated by the armature shaft which is bodily removable therefrom.

28. In an electric drill, the combination of a casing, end heads therefor, an electric motor arranged within the casing and having its bearings in such heads, one of the bearings having a bearing collar actuated by the armature shaft which is removable therefrom, and a fan mounted on said collar.

29. In an electric motor, the combination of a casing, top and bottom end heads therefor, a series of electric motors arranged within the casing and having bearings in the end heads, a tool spindle to which the motors are operatively connected, the bottom end head having bearing collars actuated by the armature shafts which are bodily removable therefrom, and fans mounted on the collars for circulating air through the casing to keep the parts air-cooled.

30. In an electric drill, the combination of a tool shaft or spindle, a plurality of electric motors annularly disposed around the axial line of said spindle but arranged beyond the inner end thereof, pinions on the ends of the armature shafts and adjacent said inner end of the spindle, gearing operatively connecting the pinions and the spindle, a casing inclosing and supporting said motors, and a gear case which incloses said gearing and in which said spindle is journaled.

31. In an electric drill, the combination of a tool shaft or spindle, a plurality of electric motors annularly disposed around the axial line of said spindle but arranged beyond the inner end thereof, pinions on the ends of the armature shafts and adjacent said inner end of the spindle, a plate having a circular internal rack by which it is connected with the spindle and with which said pinions mesh and by which it is rotated, a casing inclosing and supporting said motors, and a gear case which incloses said gears and in which said spindle is journaled.

32. In an electric drill, the combination of a tool shaft or spindle, a plurality of electric motors arranged annularly of such shaft and operatively connected therewith, and a force feed device having a thrust bearing against the inner end of the tool shaft.

33. In an electric drill, the combination of a tool shaft or spindle, a plurality of electric motors arranged annularly of such shaft and operatively connected therewith, and a force feed device comprising a feed screw arranged axially of the tool shaft or spindle and having a thrust bearing against the inner end of the latter.

34. In an electric drill, the combination of a tool shaft or spindle, a plurality of electric motors arranged annularly of such shaft and operatively connected therewith, and a force feed device comprising a fixed screw threaded shaft arranged axially of the tool shaft or spindle and having a thrust bearing against the inner end of the latter, and a feed screw also arranged axially of the tool shaft or spindle and engaging the fixed shaft.

35. In an electric drill, the combination of a casing, a plurality of electric motors arranged therein, heads secured to the ends of the casing and having bearings for the armature shafts of said motors, said casing having a series of air openings at one end adjacent the lower end plate, fans operatively connected with each armature shaft for causing circulations of air through said openings and among the parts of the different motors.

36. In an electric motor, the combination of a casing, an electric motor, a collar operatively connected with the armature shaft which shaft is removable from the collar when the motor is lifted from casing, and a fan connected with such collar.

37. In an electric motor, the combination of a casing, a tool spindle, an electric motor arranged therein, and operatively connected with the tool spindle, a fan device operatively connected with the motor, and means whereby the armature of the motor may be bodily removed from the fan device.

WILLIAM O. DUNTLEY.

Witnesses:
GEORGE A. REES,
S. E. HIBBEN.